United States Patent [19]

Cobble et al.

[11] Patent Number: 5,232,271
[45] Date of Patent: Aug. 3, 1993

[54] BRAKE SYSTEM FOR AUTOMATIC DISABLEMENT OF TOWED VEHICLE BRAKES DURING BACKING

[75] Inventors: Mark A. Cobble, Peoria; Kevin K. Nunn, East Peoria, both of Ill.

[73] Assignee: Caterpillar Inc., Peoria, Ill.

[21] Appl. No.: 830,813

[22] Filed: Feb. 5, 1992

[51] Int. Cl.⁵ ............................................. B60T 7/20
[52] U.S. Cl. ................................... 303/7; 188/112 R
[58] Field of Search ................... 188/112 R, 138, 142, 188/150; 303/7

[56] References Cited

U.S. PATENT DOCUMENTS

| | | | |
|---|---|---|---|
| 2,229,499 | 1/1941 | Fisette | 188/112 R |
| 2,969,857 | 1/1961 | Parkhurst | 188/112 R |
| 3,570,633 | 3/1971 | Garnett | 188/112 R |
| 3,754,623 | 8/1973 | Gatt | 188/112 R |
| 3,768,606 | 10/1973 | Mizen et al. | 188/112 R |
| 3,856,362 | 12/1974 | Howard | 303/7 |
| 3,880,263 | 4/1975 | Ewald et al. | 188/112 R |
| 3,892,296 | 7/1975 | DePuydt et al. | 188/112 R |
| 4,697,853 | 10/1987 | Scholz | 303/7 |

FOREIGN PATENT DOCUMENTS

| | | | |
|---|---|---|---|
| 214577 | 10/1984 | Fed. Rep. of Germany | 188/112 R |
| 2186929 | 8/1987 | United Kingdom | 188/112 R |

Primary Examiner—Robert J. Oberleitner
Assistant Examiner—Kevin D. Rutherford
Attorney, Agent, or Firm—Diana L. Charlton

[57] ABSTRACT

Surge brake systems are used so that the brakes of towed vehicles can be applied automatically during slowing and stopping of towing vehicles. However, the known surge brake systems automatically apply the brakes to the towed vehicle during backing of the towing vehicle. The subject brake system includes a solenoid actuated valve which is disposed in a brake line to communicate a surge brake coupler to the brakes in a towed vehicle. A relay receives an electrical signal from an outputting device which places the valve in a closed position which disables the surge brake coupler and prevents the application of the brakes on the towed vehicle during backing of a towing vehicle. The relay receives an electrical signal from a producing device which overrides the electrical signal from the outputting means placing the valve in an open position. The open position of the valve allows application of the brakes on the towed vehicle so that braking is possible during backing of the towing vehicle.

9 Claims, 2 Drawing Sheets

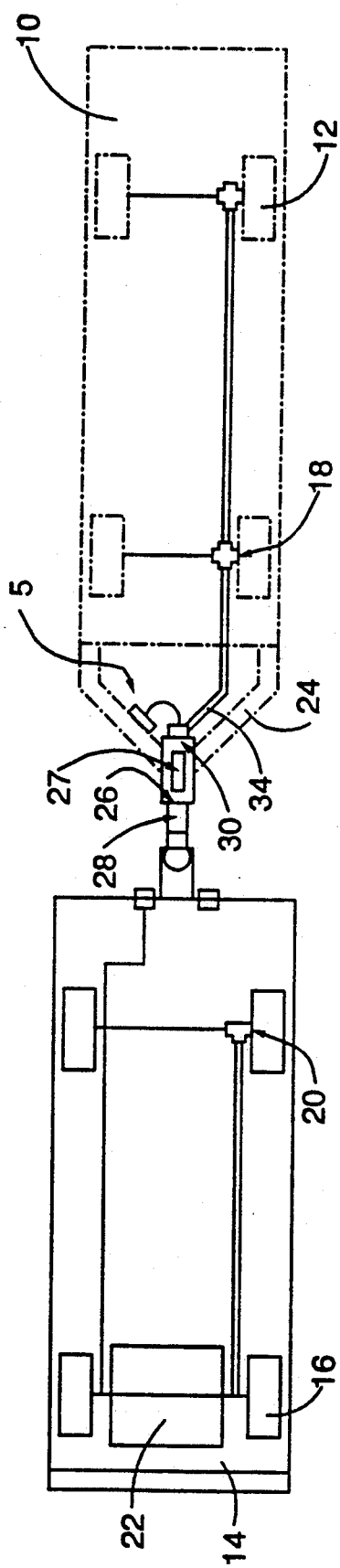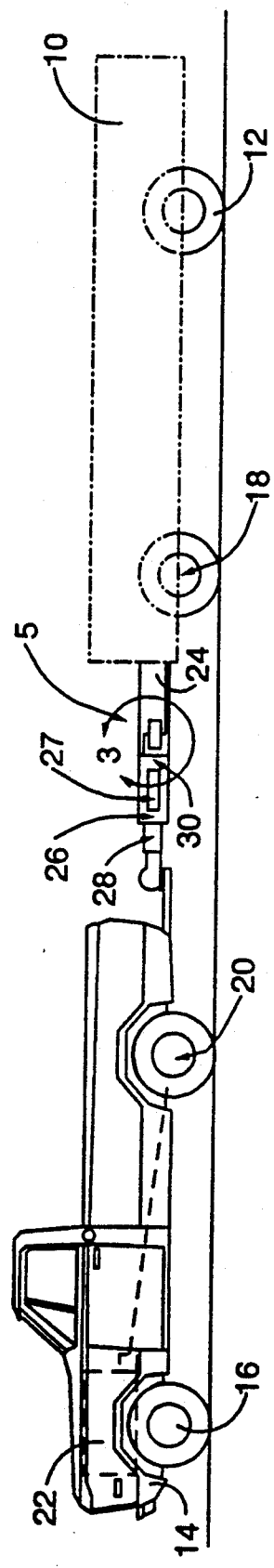

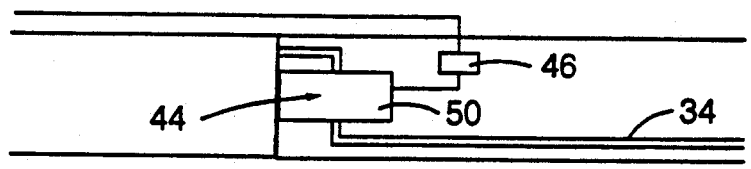
Fig_3_
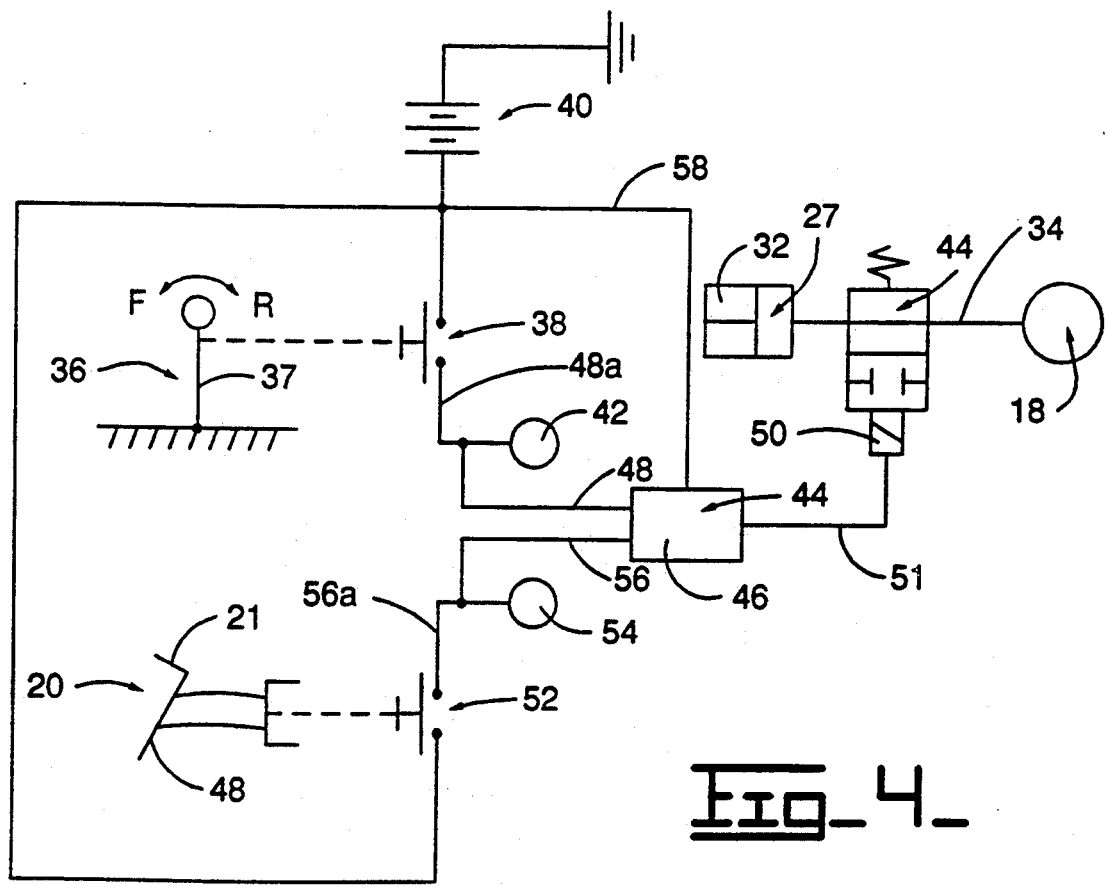
Fig_4_

BRAKE SYSTEM FOR AUTOMATIC DISABLEMENT OF TOWED VEHICLE BRAKES DURING BACKING

TECHNICAL FIELD

This invention relates generally to towed vehicles and more particularly to the automatic disablement of the brakes during backing thereof.

BACKGROUND ART

Towing and towed vehicles are used frequently to transport various equipment from one location to another. In order to prevent excessive brake wear on the towing vehicle, the towed vehicle should be provided with brakes responsive to the slowing and stopping action of the towing vehicle. The brakes for the towed vehicle may be, for example, directly connected to the braking system of the towing vehicle. However, this type of braking system is relatively expensive to purchase or install so a surge brake system may be used to reduce costs.

Surge brake systems for towed vehicles are well known in the art and are used to automatically apply the brakes of the towed vehicle. A typical surge brake system is connected to the hitch and has a hydraulic cylinder which operates in response to the relative telescopic movement between two members. Relative telescopic movement of the two members occurs during slowing, stopping, or backing of a towing vehicle when the towed vehicle advances toward the towing vehicle. Although braking is necessary on the towed vehicle when the towing vehicle slows or stops, it is detrimental to have the brakes applied to the towed vehicle during backing of the towing vehicle. The application of the brakes of the towed vehicle during backing may damage the towing vehicle or lead to premature wear and possible failure of the brakes on the towed vehicle. In addition, when the towing vehicle is backing up on an inclined surface the application of the brakes of the towed vehicle may completely prevent the backing maneuver.

It is known that a valve can be used to disable the surge brake during backing of the towing vehicle and prevent the application of the brakes on the towed vehicle. However, the valve is closed manually by an operator. If the valve is not reopened after backing the towing vehicle, due to human error, the towed vehicle no longer has any braking capabilities. Without the brakes on the towed vehicle, excessive brake wear on the towing vehicle as mentioned above is again encountered.

The present invention is directed to overcoming one or more of the problems as set forth above.

DISCLOSURE OF THE INVENTION

A brake system is disclosed for use in a towed vehicle having a plurality of wheels with the towed vehicle being adapted for use with a towing vehicle having a plurality of wheels and a hitch therebetween for slidably interconnecting the towed and towing vehicles. Prime mover means is included on the towing vehicle for driving at least some of the wheels thereon in either a forward or reverse drive condition. A means for selecting either the forward or reverse drive condition of the prime mover means, a means for outputting a signal when the means for selecting is in the reverse drive condition and a source of energy for energizing the outputting means is provided. Wheel brake means are included and operatively associated with at least some of the plurality of wheels on the towed vehicle. The brake system further includes a surge brake means for automatically applying the brake means when the towed vehicle advances toward the towing vehicle and a means responsive to the reverse drive condition signal for automatically disabling the surge brake control means and to prevent application of the wheel brake means.

The present invention removes the possibility of human error encountered with a manual disabling system by receiving a signal from the outputting means when the towing vehicle is in the reverse drive condition. A means is responsive to the signal for automatically disabling the surge brake means and to prevent application of the wheel brake means on the towed vehicle.

BRIEF DESCRIPTION OF THE DRAWINGS

FIG. 1 is a plan view of the vehicles including the present invention.

FIG. 2 is an elevation view of the vehicles including the present invention.

FIG. 3 is an enlarged view of the detail encircled by line 3 on FIG. 2.

FIG. 4 is an electrical and fluid schematic of the present invention.

BEST MODE FOR CARRYING OUT THE INVENTION

A brake system 5 for a towed vehicle 10 having a plurality of wheels 12 is illustrated in FIG. 1. The towed vehicle is adapted for use with a towing vehicle 14 having a plurality of wheels 16. A wheel brake means 18 is operatively associated with at least some of the plurality of wheels 12 on the towed vehicle and a wheel brake means 20 is operatively associated with at least some of the plurality of wheels 16 on the towing vehicle 14. The wheel brake means 18,20 for the vehicles may include, for example, conventional hydraulic wheel brakes although any suitable brake means may be used. The wheel brake means 20 for the towing vehicle 14 may also include a foot pedal 21, shown schematically in FIG. 4, to actuate the hydraulic brakes. A prime mover means 22, such as an engine and a suitable driving connection, is provided on the towing vehicle 14 for driving at least some of the plurality of wheels 16 in either a forward or reverse drive condition. A hitch 24 is positioned between the towed vehicle 10 and the towing vehicle 14 for slidably limited interconnection between the vehicles.

A surge brake means 26, such as a surge brake coupler, is connected to the hitch 24 for automatically applying the wheel brake means 18 for the towed vehicle 10 when the towed vehicle 10 advances toward the towing vehicle 14. The surge brake means 26 includes an actuation means 27 which may operate, for example, hydraulically for automatically applying the brakes. However, the actuation means 27 may be operated by any other suitable method, such as, electrically or pneumatically. The surge brake means 26 includes an inner assembly 28 and an outer assembly 30 connected such that the outer assembly 30 telescopically receives the inner assembly 28. The actuation means 27 includes a master cylinder 32, shown schematically in FIG. 4, which is attached to the outer assembly 30 and positioned such that the master cylinder 32 is operatively associated with the inner assembly in a conventional manner. A brake line 34 serves to communicate the master cylinder 32 with the wheel brake means 18.

A means 36 such as, for example, a gear shift lever 37 for selecting either the forward or reverse drive condition of the prime mover means 22 is shown schematically in FIG. 4. A means 38 is provided, such as a switch, for outputting a signal and is connected to the selecting means 36 and activated when the means for selecting 36 is in the reverse drive condition. A source of electrical energy 40, such as a battery, for energizing the outputting means 38 is also provided. A backup light 42 is connected to the outputting means 38 for receiving the reverse drive condition signal. A means 44 responsive to the reverse drive condition signal is provided for disabling the surge brake means 26 and to prevent application of the wheel brake means 18. The disabling means may include, for example, a relay 46. A backup signal line 48 connects the outputting means 38 to the relay 46. A backup light line 48a connects the outputting means 38 to the backup light 42. The disabling means 44 may also include a solenoid actuated valve 50 connected to and disposed in the brake line 34. The solenoid valve 50 has an open position allowing communication through the brake line 34 and a closed position blocking communication through the brake line 34. A solenoid actuating signal line 51 connects the solenoid valve 50 to the relay 46.

A means 52 is provided, such as a switch, for producing a signal and is connected to the wheel brake means 20 and activated when the wheel brake means 20 is applied in the towing vehicle 14. The source of energy 40 may also energize the producing means 52, although any other suitable energizing source may be used. A brake light 54 is connected to the producing means 52 for receiving the brake applying signal. A brake signal line 56 connects the producing means 52 with the relay 46. A brake light signal line 56a connects the producing means 52 to the brake light 54. An energy signal line 58 connects the source of energy 40 to the relay 46.

INDUSTRIAL APPLICABILITY

When the towing vehicle 14 is in the forward drive condition due to the cooperation between the gear shift lever 37 and the prime mover 22, the solenoid is in the open position which allows the surge brake coupler 26 to actuate the brakes 18 on the towed vehicle 10 during slowing and stopping of the towing vehicle 14. During the slowing and stopping action, the towed vehicle 10 advances toward the towing vehicle 14 urging the inner assembly 28 of the surge brake coupler 26 into the outer assembly 30. Subsequent to the relative movement between the inner and outer assemblies 28 and 30, respectively, the master cylinder 32 is actuated. The actuation of the master cylinder 32 increases the pressure within the brake line 34 thereby applying the brakes 18 on the towed vehicle 10.

When the towing vehicle 14 is in the reverse drive condition, the towed vehicle 10 advances toward the towing vehicle 14 and the surge brake coupler 26 begins to operate as described above. The reverse drive condition of the towing vehicle 14 closes the switch 38 outputting an electrical signal to the relay 46 placing the solenoid valve 50 in the closed position blocking communication through the brake line 34. The closing of the solenoid valve 50 disables the surge brake coupler 26 and prevents the application of the brakes 18 on the towed vehicle 10. When the brakes 20 of the towing vehicle 14 are manually applied while in the reverse drive condition, the switch 52 closes producing an electrical signal to the relay 46 which overrides the electrical signal from the switch 38. The override allows the solenoid valve 50 to move to the open position so that the brakes 18 on the towed vehicle 10 can be applied.

It should be noted that although the signal lines 48, 56, and 58 are shown continuous it is understood that a quick disconnect line of a conventional design could be used between the towing vehicle and the towed vehicle.

In view of the above, it is apparent that the present invention provides an improved means to disable the surge brake coupler and to automatically prevent the application of the brakes on a towed vehicle during backing. The present invention utilizes a solenoid valve which automatically is actuated by a relay through an electrical signal from the outputting means of a towing vehicle. The valve closes, disabling the surge brake coupler and preventing the brakes on the towed vehicle from being applied. The relay overrides the electrical signal from the outputting means when the brakes are applied on the towing vehicle during backing. This override allows the valve to pen thereby allowing the brakes on the towed vehicle to be applied. The present invention is simple, economical, and eliminates the problems encountered with a manual valve system.

Other aspects, objects, and advantages of the invention can be obtained from a study of the illustrations, the disclosure, and the appended claims.

We claim:

1. A brake system for use in a towed vehicle having a plurality of wheels, the towed vehicle being adapted for use with a towing vehicle having a plurality of wheels and a hitch therebetween for slidably interconnecting the towed and towing vehicles, prime mover means on the towing vehicle for driving at least some of the plurality of wheels in either a forward or reverse drive condition, means for selecting either the forward or reverse drive condition of the prime mover means, means for outputting a signal when the means for selecting is in the reverse drive condition, a source of energy for energizing the outputting means, brake means operatively associated with at least some of the plurality of wheels on the towed vehicle, wheel brake means operatively associated with at least some of the plurality of wheels on the towing vehicle, and means connected to the wheel brake means on the towing vehicle for producing a signal when the wheel brake means on the towing vehicle is applied, the producing means being energized by the source of energy, comprising:

surge brake means for automatically applying the wheel brake means on the towed vehicle when the towed vehicle advances toward the towing vehicle; and means responsive to the reverse drive condition signal for automatically disabling the surge brake means to prevent application of the wheel brake means on the towed vehicle, the disabling means being responsive to the brake applying signal for overriding the reverse drive condition signal and automatically enabling the surge brake means to allow application of the wheel brake means on the towed vehicle.

2. The brake system of claim 1, wherein the surge brake means includes an actuation means for automatically applying the wheel brake means.

3. The brake system of claim 2, wherein the actuation means includes a master cylinder positioned at a location sufficient for being actuated when the towed vehicle advances toward the towing vehicle and a brake line communicating the master cylinder with the wheel brake means.

4. The brake system of claim 3, wherein the disabling means includes a solenoid actuated valve connected to and disposed in the brake line, the valve has an open position allowing communication through the brake line and a closed position blocking communication through the brake line.

5. The brake system of claim 4, wherein the disabling means includes a relay connected to the valve and the producing and outputting means.

6. The brake system of claim 5, wherein the relay is adapted to receive the reverse drive condition signal from the outputting means to place the valve in the closed position.

7. The brake system of claim 6, wherein the relay is adapted to receive the brake applying signal from the producing means to override the reverse drive condition signal from the outputting means to place the vale in the open position.

8. The brake system of claim 7, including a backup light and a backup light signal line connecting the backup light to the outputting means for receiving the reverse drive condition signal.

9. The brake system of claim 8, including a brake light and a brake light signal line connecting the brake light to the producing means for receiving the brake applying signal.

* * * * *

UNITED STATES PATENT AND TRADEMARK OFFICE
CERTIFICATE OF CORRECTION

PATENT NO.   :   5,232,271

DATED        :   August 3, 1993

INVENTOR(S)  :   Mark Cobble et al.

It is certified that error appears in the above-identified patent and that said Letters Patent is hereby corrected as shown below:

In claim 1, column 4, line 42, after "means," add --wheel--.

Signed and Sealed this

Thirty-first Day of May, 1994

Attest:

Attesting Officer

BRUCE LEHMAN

Commissioner of Patents and Trademarks